United States Patent
Van Heuklon et al.

(10) Patent No.: US 9,002,668 B2
(45) Date of Patent: Apr. 7, 2015

(54) DISCOVERING AN EQUIPMENT POWER CONNECTION RELATIONSHIP

(75) Inventors: Jeffery John Van Heuklon, Rochester, MN (US); Douglas Andrew Wood, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1160 days.

(21) Appl. No.: 12/769,012

(22) Filed: Apr. 28, 2010

(65) Prior Publication Data
US 2011/0270461 A1 Nov. 3, 2011

(51) Int. Cl.
*G01R 19/00* (2006.01)
*G06F 11/30* (2006.01)

(52) U.S. Cl.
CPC ........ *G06F 11/3062* (2013.01); *G06F 11/3006* (2013.01); *G06F 11/3051* (2013.01); *G06F 11/3096* (2013.01)

(58) Field of Classification Search
CPC ............ G06F 11/3062; G06F 11/3006; G06F 11/3051; G06F 11/3096
USPC ................. 702/60–62, 64, 117–118, 182, 189
See application file for complete search history.

(56) References Cited

U.S. PATENT DOCUMENTS

| | | | |
|---|---|---|---|
| 7,249,331 B2 | 7/2007 | Bose et al. | |
| 7,549,069 B2 | 6/2009 | Ishihara et al. | |
| 7,549,070 B2 | 6/2009 | Zwinger et al. | |
| 2006/0259621 A1 | 11/2006 | Ranganathan et al. | |
| 2007/0198864 A1 | 8/2007 | Takase et al. | |
| 2008/0209247 A1 | 8/2008 | Thelander et al. | |
| 2008/0244281 A1 | 10/2008 | Felter et al. | |
| 2009/0198385 A1 | 8/2009 | Oe et al. | |
| 2010/0005331 A1* | 1/2010 | Somasundaram et al. | 713/340 |
| 2010/0280774 A1* | 11/2010 | Ewing et al. | 702/60 |

OTHER PUBLICATIONS

IBM, "Optimizing the enerry consumption of a group of servers," Apr. 8, 2009.
IBM, "High Efficiency Power Management with dynamic phase control," Apr. 13, 2009.

* cited by examiner

*Primary Examiner* — Mischita Henson
(74) *Attorney, Agent, or Firm* — Garg Law Firm, PLLC; Rakesh Garg; Parashos Kalaitzis

(57) ABSTRACT

A method, system, and computer usable program product for discovering an equipment power connection relationship between an equipment and an electrical power outlet. A workload executing on the equipment is monitored for a period resulting in monitoring data. The Metering data associated with a first power outlet in a plurality of power outlets is searched, the metering data representing electrical power drawn from a power outlet over the period. A determination is made whether the monitoring data matches with the metering data associated with the first power outlet. If a match is determined, a relationship is identified between the equipment and the first power outlet, whereby the first power outlet is known to supply electrical power to the equipment.

17 Claims, 5 Drawing Sheets

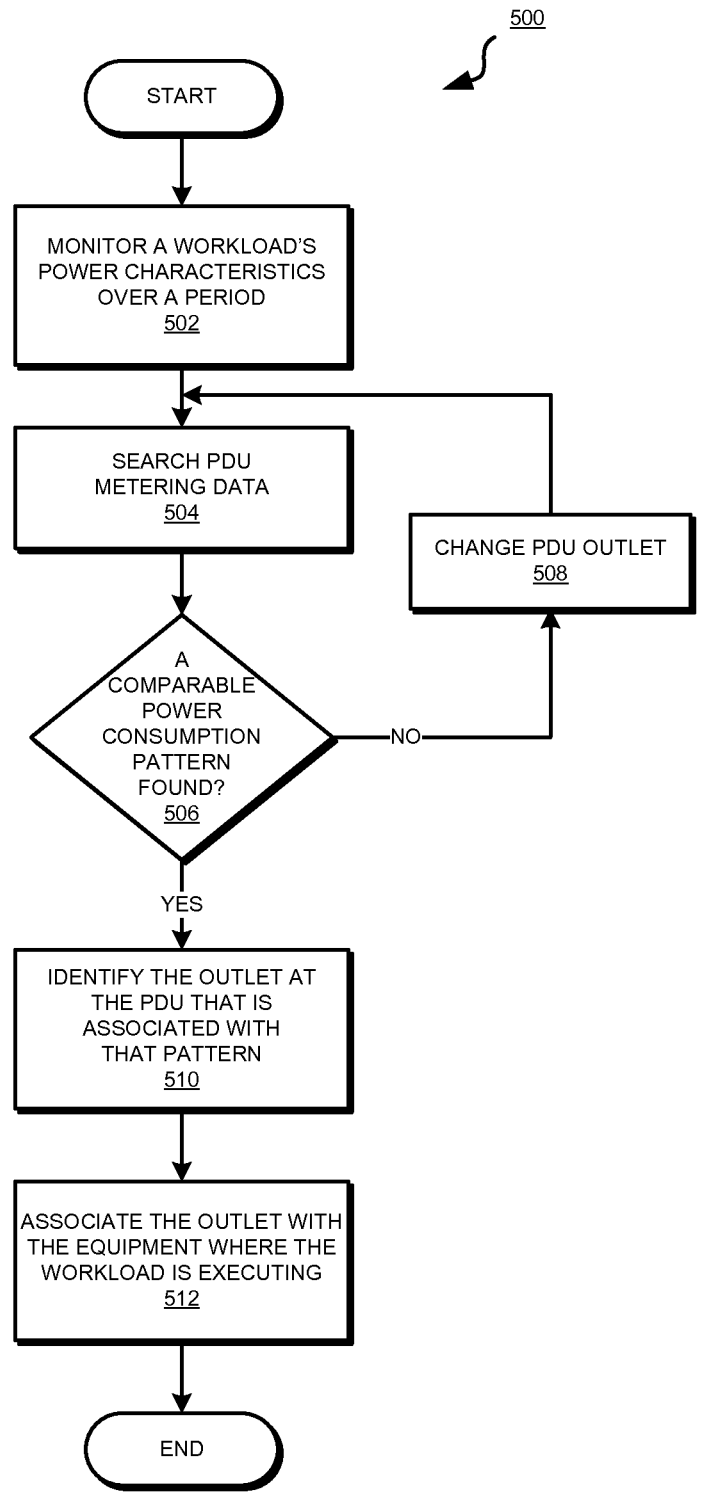

DISCOVERING AN EQUIPMENT POWER CONNECTION RELATIONSHIP

BACKGROUND OF THE INVENTION

1. Field of the Invention

The present invention relates generally to an improved data processing environment, and in particular, to a computer implemented method for managing the power distribution in the data processing environment. Still more particularly, the present invention relates to a computer implemented method, system, and computer usable program code for discovering an equipment's power connection relationship in a data processing environment.

2. Description of the Related Art

Data processing environments often include multiple data processing systems. The data processing systems each have need for electrical power for performing their respective functions.

In certain data processing environment configurations, such as in a data center, several data processing systems may be configured to receive bulk power over a common power line. The bulk power is then distributed to the various data processing systems via power distribution mechanism, such as a power distribution tree.

For example, a single bulk power cable may fan out to several power distribution units. A power distribution unit distributes electrical power to several devices or equipment, including information technology (IT) equipment and facilities equipment. IT equipment may be any data processing system, or any device equipment or component thereof usable in performing computations. For example, a computer, a storage array, a network bridge, or a monitor may be examples of IT equipment.

Facilities equipment may be any equipment used for keeping a computation facility, such as a building or space, rack or cabinet, or other such facilities operational. For example, a power supply panel, a cooling fan, an HVAC unit, or a lighting unit may be examples of facilities equipment.

In large-scale data processing environments, extensive cabling may distribute power to numerous equipment. Such cabling may further span several rooms, floors, or even buildings in such data processing environments.

SUMMARY OF THE INVENTION

The illustrative embodiments provide a method, system, and computer usable program product for discovering an equipment power connection relationship between an equipment and an electrical power outlet. An embodiment monitors for a period, a workload executing on the equipment. The monitoring results in monitoring data. The embodiment searches a metering data associated with a first power outlet in a plurality of power outlets, the metering data representing electrical power drawn from a power outlet over the period. The embodiment determines whether the monitoring data matches with the metering data associated with the first power outlet. The embodiment, in response to determining a match, forms a relationship between the equipment and the first power outlet, whereby the first power outlet is known to supply electrical power to the equipment.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 5 depicts a flowchart of a process of discovering an equipment-power connection outlet relationship in accordance with an illustrative embodiment.

DETAILED DESCRIPTION OF THE PREFERRED EMBODIMENT

Figure 1:
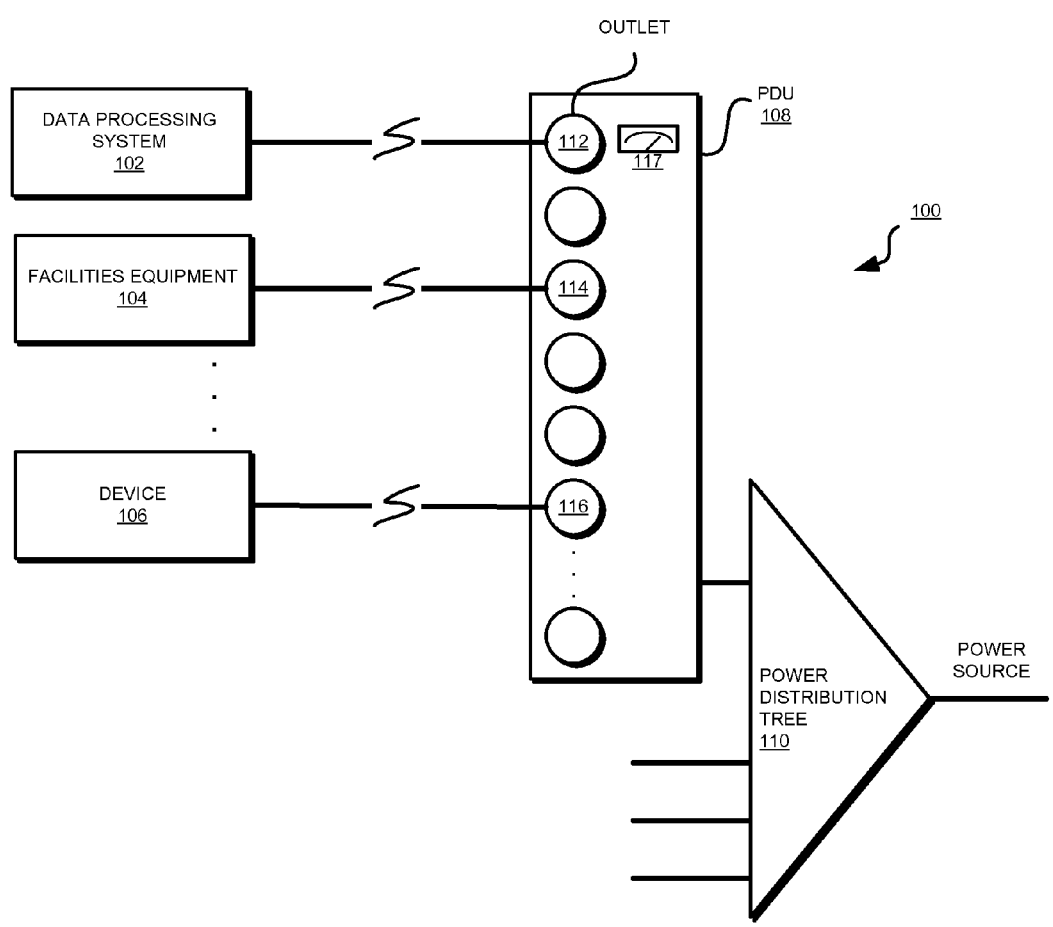
FIG. 1 depicts a block diagram of a data processing environment configuration in which illustrative embodiments may be implemented.

The invention recognizes that availability of electrical power in the amount desired can be a factor in the performance of a data processing system. As a data processing system is loaded with computational workloads, the power consumption of the data processing system can increase.

Management applications manage the workload assigned to an IT equipment and the maximum power draw of that equipment to keep power utilization within desired or available limits. Management applications may also reconfigure the power distribution tree to insure that sufficient power is available when needed. To perform this function, a management application must understand the relationship between an equipment and the power distribution tree. In particular, the management application must know to which outlet of which power distribution unit (PDU) the equipment is connected. The invention recognizes that such information has to be maintained and updated regularly, so that a management application can operate correctly.

The invention further recognizes that in data processing environments, equipment can be, and often is, plugged out of their current PDU outlets and re-plugged into other PDU outlets. For example, new equipment may be added, existing equipment may be relocated, and old equipment may be removed. This activity causes equipment to be connected to and disconnected from PDUs.

The invention recognizes that even the normal operational activities in a data processing environment can cause the information of the relationship between equipment and outlets to become obsolete. Obsolete information of the relationship between equipment and PDU outlets can cause a PDU to perform incorrect power measurement and distribution.

For example, incorrect power distribution by a PDU can cause a server to starve for power when needed, degrading the server's performance. In certain circumstances, incorrect power distribution may cause a circuit breaker to trip or an uninterruptable power supply to be exhausted prematurely. As another example, incorrect power management due to incorrect relationship between equipment and power outlets can cause reliability problems. For example, a server may be connected to two different PDUs for redundancy. If the relationship between the server and the outlets on the PDUs is not known and one of the PDUs is shutdown, the server will lose the reliability associated with power redundancy.

The illustrative embodiments used to describe the invention generally address and solve the above-described problems and other problems related to power distribution in data processing environments. The illustrative embodiments provide a method, computer usable program product, and data processing system for discovering an equipment power connection relationship in the data processing environment.

An embodiment of the invention may enable the discovering which equipment is currently connected to which electrical power outlet of which PDU in a given data processing environment. A PDU according to an embodiment may be any type of power distribution device, ranging from a surge strip capable of measuring power output at the outlets, to sophisticated power distribution systems that monitor, meter, and manage power distribution across several outlets. As long as a power distribution device or configuration of devices is capable of measuring power output at an outlet, such device or configuration of devices can serve as a PDU within an embodiment.

The illustrative embodiments are described with respect to data, data structures, and identifiers only as examples. Such descriptions are not intended to be limiting on the invention.

Furthermore, the illustrative embodiments may be implemented with respect to any type of equipment. For example, an illustrative embodiment described with respect to an IT equipment may be implemented using a facilities equipment within the scope of the invention.

The illustrative embodiments are further described with respect to certain parameters, attributes, and configurations only as examples. Such descriptions are not intended to be limiting on the invention.

An application implementing an embodiment may take the form of data objects, code objects, encapsulated instructions, application fragments, services, and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
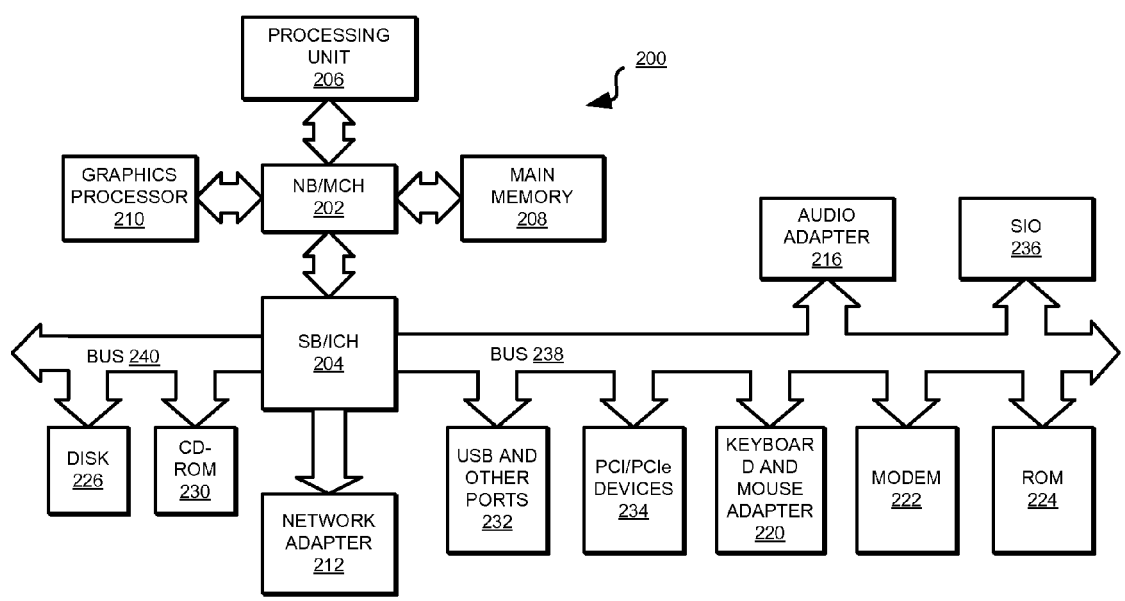
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a data processing environment configuration in which illustrative embodiments may be implemented. Equipment in data processing environment 100 may include a variety of equipment. For example, data processing system 102 may be an IT equipment, facilities equipment 104 may be any type of facilities equipment, and device 106 may be any type of IT or facilities equipment.

PDU 108 may be a set of PDUs. A set of PDUs is one or more PDUs. PDU 108 may be a part of power distribution tree 110. Power distribution tree 110 may receive bulk power from any power source, including another PDU or power distribution tree.

A PDU, such as PDU 108, may include a set of outlets similar to outlet 112, 114, and 116. A set of outlets is one or more outlets. An outlet may be associated with a metering device that meters the power output from the outlet over a period. Metering device 117 is shown associated with outlet 112 as an example. Metering device 117 may additionally meter power output from additional outlets and may be switchable from outlet to outlet.

An equipment may be connected to any available outlet. For example, data processing system 102 is depicted as being connected to outlet 112, facilities equipment 104 is connected to outlet 114, and device 106 is connected to outlet 116. A connection of an equipment to an outlet may include any number of intervening devices or equipment. An equipment, such as data processing system 102, is said to be connected to an outlet and said to have a relationship with that outlet, such as outlet 112, if that equipment receives electrical power from that outlet.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
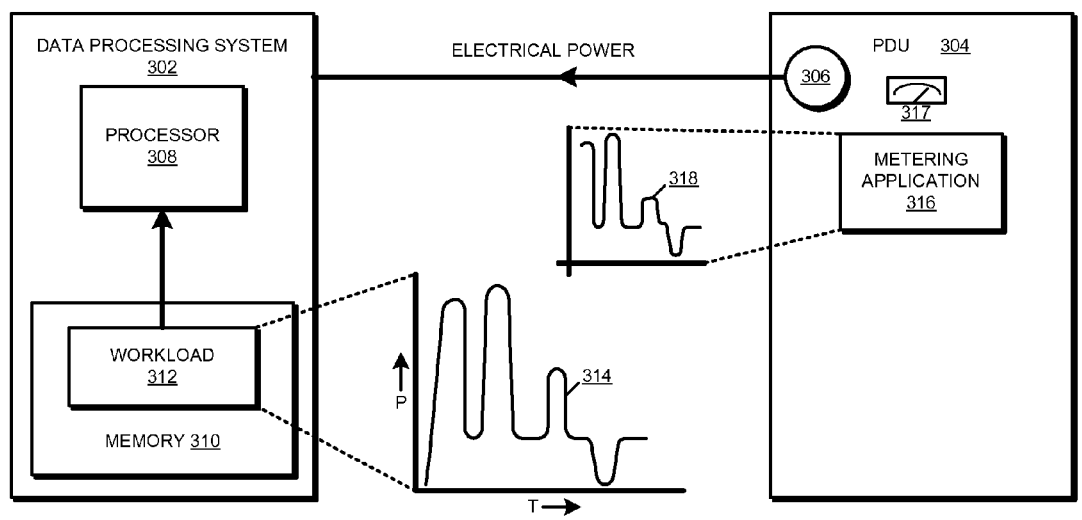
FIG. 3 depicts a block diagram of an IT equipment configuration for discovering an equipment power connection relationship in accordance with a illustrative embodiment.

With reference to FIG. 3, this figure depicts a block diagram of an IT equipment configuration for discovering an equipment power connection relationship in accordance with a illustrative embodiment. Data processing system 302 may be an example IT equipment, such as data processing system 102 in FIG. 1. PDU 304 may be any PDU, such as PDU 108 in FIG. 1.

Data processing system 302 may be connected to outlet 306 of PDU 304 via any number of intervening cables or other equipment. Data processing system 302 includes processor 308 and memory 310. Processor 308 executes instructions stored in memory 310. Memory 310 may be any suitable data storage device within the scope of the invention.

In accordance with an embodiment, instructions for workload 312 may be loaded in memory 310. Workload 312 is configured in such a manner that when executed in data processing system 302, data processing system 302 consumes power in a specific pattern. In other words, the power drawn by data processing system 302 when executing workload 312 can be plotted as a power draw graph 314.

Power draw graph 314 is depicted as a graph only as an example and is not limiting on the invention. Power draw graph 314 may be any other suitable representation of the power drawn by data processing system 302 over a period when workload 312 is executing on data processing system 302.

In one embodiment, workload 312 is configured such that power draw graph 314 includes certain distinctive characteristics. For example, power draw graph 314 may include a set number of peaks, valleys, or a combination thereof, over a given period. As another example, power draw graph 314 may include one or more peaks or valleys achieving a specified value or range. As another example, power draw graph 314 may include one or more peaks or valleys appearing in a particular order. As another example, power draw graph 314 may include one or more peaks or valleys spaced from one another in a particular way. These examples of distinctive characteristics of power draw graph 314 are described only for the clarity of an embodiment and are not intended to be limiting on the invention. Any known characteristic of any power draw graph can be used as power draw graph 314 within the scope of the invention.

For example, in another embodiment, workload 312 may not be a specially configured workload at all. Workload 312 may be any workload executing on data processing system 302 causing the power drawn at data processing system 302 to enable some representation of power draw graph 314 from which some characteristics of the power draw can be ascertained over a given period.

PDU 304 may further include metering application 316. Metering application 316 may utilize metering device 317 to acquire metering data. Metering application 316 is configured to measure the power drawn from one or more outlets, including outlet 306, over a given period. Metering application 316 may be a hardware, software, or firmware implemented metering application within the scope of the invention.

Metering application 316 is depicted as a part of PDU 304 only as an example to describe the operation of an embodiment. In one embodiment, PDU 304 may include only metering device 317, or be otherwise capable of only providing an outlet's power output metering data.

Furthermore, PDU 304 or a component thereof may or may not be capable of producing graphical representation of such metering data. In another embodiment, metering application 316 may be a remote application, such as a central consolidation application executing on an administration server, that may receive the metering data and produce graphical representation thereof. For example, a central consolidation application may be configured to detect patterns in the metering data itself or in a graphical representation of the metering data. A consolidating application may gather the power output metering data, or graphs if available, from all the monitored outlets. The consolidating application may search the set of graphs to find one that matches the workload graph.

The measurements made by metering application 316 for power drawn from outlet 306 in a period when data processing system 302 executed workload 312 may be represented as power draw graph 318. Comparing power draw graphs 314 and 318, certain distinctive characteristics of one power draw graph may be discerned in another. Upon matching a configurable number of distinctive characteristics in power draw graphs 314 and 318, a conclusion can be reached that data processing system 302 is connected to outlet 306 at PDU 304. In other words, data processing system 302 is discovered to be related to outlet 306 according to the invention.

As an example, in one embodiment, power drawn by data processing system 302 may be recorded at a shorter interval as compared to the power output at outlet 306. Accordingly, power draw graph 314 may plot or record power consumption at a finer time-granularity as compared to power draw graph 318. Another embodiment may be vice-versa.

In another example embodiment, power drawn by data processing system 302 may be recorded at a predetermined interval as compared to an analog recording of the power output at outlet 306. Accordingly, power draw graph 314 may plot or record power consumption at a coarser time-granularity as compared to power draw graph 318. Another embodiment may be vice-versa.

Generally, any manner of recording the power draw at an equipment or power output at an outlet may be configured in an embodiment without limitation. One consideration in making the recordings should be that any distinctive characteristics of one power draw recording should be discernable in some form in the other power draw recording.

For example, an equipment, such as a data processing system 302, may be configured with redundant power supplies, to wit, the server may receive power from two outlets, PDUs, or power supplies, including outlet 306 at PDU 304. Accordingly, power draw graph 318 may appear as essentially of the same pattern but at half the magnitude. For example, a peak value of 10 units on graph 314 may appear as a peak value of 5 units in graph 318, however, the peaks will appear in both graphs at substantially the same position.

Additionally, an equipment, such as a server, may consume power in a particular pattern just to remain operational without executing a workload. While executing a workload, the power consumed for executing the workload is in addition to the power needed to remain operational. Under such a circumstance, a representation of the power drawn during the workload execution may be cumulative at the equipment end as well as the outlet end. Accordingly, the distinctive characteristics of such a cumulative representation may be different from any distinctive characteristics anticipated for the execution of the workload. Yet, such distinctive characteristics of the cumulative recordings may be substantially similar in the recordings of the power draw at the equipment and the power output at the outlet. Generally, within the scope of the embodiments, an algorithm to match the power draw and power output recordings may be able to eliminate such accumulation and other noise patterns in the recording that may distort certain distinctive features.

Certain equipment, such as certain data processing systems, include power leveling or other power management applications or devices. The power leveling or other power management devices or applications are designed to reduce the fluctuations in the power drawn by the data processing system during a period of operation. Such power leveling or other power management applications or devices may optionally be turned off or their effects should be neutralized in other ways so that the representations of power draw include recognizable distinctive characteristics Granularity of power draw data recording may be another consideration when implementing an embodiment. For example, present metering applications, such as metering application 316, measure power output infrequently. For example, some metering applications measure the power output at PDUs only once every minute, whereas the CPU utilization and corresponding power draw at a data processing system may be measured every millisecond. Accordingly, an implementation should configure an embodiment such that a suitable number of distinctive characteristics appear in the power output recording made at the outlet so that the recording can be uniquely matched with a power draw recording at the equipment.

Duration of power draw data recording may be another consideration when implementing an embodiment. For example, present metering applications, such as metering application 316, measure power output infrequently. For example, some metering applications measure the power output at PDUs only once every minute, whereas certain workloads, such as a disk I/O, may fully execute within a few milliseconds. Accordingly, an implementation should configure an embodiment such that workload designed to produce a power draw graph with distinctive characteristics executes long enough that at least one power output recording can be made at the outlet during the execution of the workload. For example, an artificially designed workload may compute very heavily for a know amount of time—possible measured in minutes, and then may remain idle for a known amount of time, again possibly measured in minutes. By alternating such a pattern over many minutes, or even hours, a power draw pattern can be produced on a time scale that is comparable to the frequency at which the PDU meters read outlet power output.

The time of beginning a workload execution may not align with a time at which the power output measurement is taken at a PDU. In other words, power draw graph 314 may begin and include some distinctive characteristics before the beginning of power draw graph 318. Accordingly, an implementation may also accommodate such a shift by executing a workload long enough such that some distinctive characteristics of power draw graph 314 appear on power draw graph 318 as well.

Figure 4:
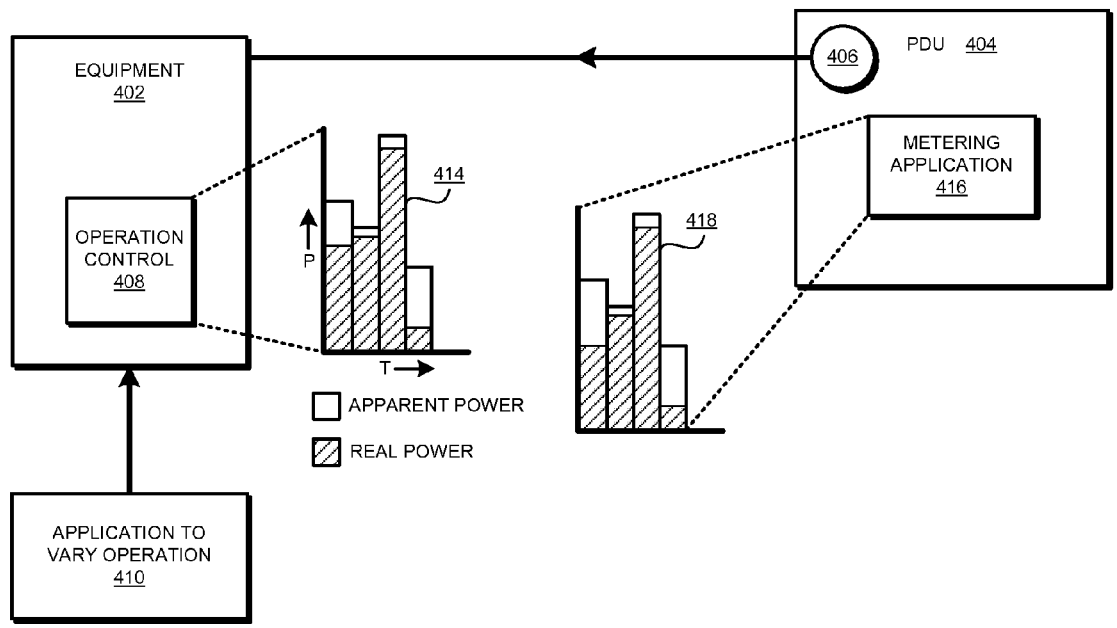
FIG. 4 depicts a block diagram of an equipment configuration for discovering an equipment power connection relationship in accordance with an illustrative embodiment.

With reference to FIG. 4, this figure depicts a block diagram of an equipment configuration for discovering an equipment power connection relationship in accordance with an illustrative embodiment. As described with respect to FIG. 3, workloads can be configured to cause distinctive power draw graphs, which can be matched to determine equipment-outlet relationships. According to an embodiment, workloads may be configured on facilities equipment as well, for example, by programmatically varying the speed on a variable speed fan on a computer room air conditioning (CRAC) unit.

Equipment 402 may be a facilities equipment, such as facilities equipment 104 in FIG. 1. PDU 404 and outlet 406 may be similar to PDU 304 and outlet 306 respectively in FIG. 3.

Operation control 408 may be a control apparatus for controlling or otherwise manipulating an operation of equipment 402. Furthermore, application 410 may be an application that may vary or otherwise manipulate an operation of equipment 402. For example, application 410 may actuate operation control 408.

In operation, as an example, equipment 402 may draw real power as well as reactive power. Reactive power is a virtual component of the electrical power when the electrical circuit drawing the power includes inductive or capacitive components. Apparent power is a combination of the real and reactive power. Power factor is a function of the real power and apparent power.

By configuring application 410, operation control 408, or a combination thereof, equipment 402 may be operated in a manner that produces distinctive characteristics in power draw graph 414. For example, certain power factor may be noted at certain times in graph 414.

Metering application 416 may be similar in operation to metering application 316 in FIG. 3. Metering application 416 may produce graph 418 for the same period, or a portion thereof, when equipment 402 is operated to produce graph 414. Graph 418 may also include the same or similar distinctive characteristics as in graph 414. For example, at a given time, graphs 414 and 418 may both show power draw and power output at a certain power factor.

As with graphs 314 and 318 in FIG. 3, graphs 414 and 418 may be represented in any manner without departing the scope of the invention. Distinctive characteristics on graphs 414 may be similar, but not necessarily identical on graph 418, such that graphs 414 and 418 may be considered a unique match with one another. Upon such matching, equipment 402 may be said to be related to outlet 406 in accordance with the invention.

With reference to FIG. 5, this figure depicts a flowchart of a process of discovering an equipment-power connection outlet relationship in accordance with an illustrative embodiment. Process 500 may be implemented in an application, such as an application executing in data processing system 302 in FIG. 3. Generally, an application implementing an embodiment of the invention may execute anywhere in a data processing environment such that the application has access to the power draw recording and the power output recordings for making the comparison according to an embodiment.

Process 500 begins by monitoring a workload's power characteristics over a period (step 502). In one embodiment, process 500 may already know a workload's power characteristics in advance, such as from a previous run or a benchmarking operation in a lab environment. Process 500 notes a set of distinctive characteristics in the data produced by such monitoring. A set of distinctive characteristics is one or more characteristics.

Process 500 searches PDU metering data (step 504). As described with respect to FIGS. 3 and 4, a metering application at a PDU may produce metering data that may also include a set of distinctive characteristics.

Process 500 determines whether a comparable power consumption pattern is found in comparing the monitoring data of step 502 and the metering data of step 504 (step 506). In one embodiment, for example, one or more similar distinctive characteristics appearing in similar temporal location in the monitoring data of step 502 and the metering data of step 504 may constitute a matching pattern of step 506.

If a matching pattern is not found ("No" path of step 506), process 500 changes the PDU outlet whose data to use in step 504 (step 508). Process 504 returns to step 504 to search the metering data of the changed outlet of step 508. In one embodiment, process 500 may search the metering data of several outlets for a match in parallel.

If, and eventually when, a matching pattern is found ("Yes" path of step 506), process 500 identifies the outlet as that PDU whose metering data matched the monitoring data of step 502 (step 510). Process 500 associates or relates the outlet of step 510 with the equipment where the workload of step 502 was executing (step 512). Process 500 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for discovering an equipment power connection relationship in a data processing environment. Using the embodiments of the invention, a data processing environment can correctly map an equipment to a metered power outlet. Such a mapping allows a PDU to manage power accurately in the data processing environment by directing or redirecting power to and from the correct outlets as needed.

An embodiment can also be used with equipment that is not conducive to changing workloads or measurement of power consumption while executing a workload. For example, such an equipment can be operated normally in a test environment while benchmark measurements are recorded. When connected in the data processing environment, metering data of the various outlets can be searched to find a match or similarity with the benchmark pattern. The matching outlet can then be associated with the equipment in the manner of the invention.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless. The terms "computer usable storage device" and "storage device" do not encompass a signal propagation medium, any description in this disclosure to the contrary notwithstanding.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for discovering a relationship between an equipment and an electrical power outlet, the computer implemented method comprising:
   using a processor and a memory to monitor, for a period, a workload executing on the equipment, the monitoring resulting in a monitoring data pattern;
   using the processor and the memory to search a metering data associated with a first power outlet in a plurality of power outlets, the metering data representing electrical power drawn from a power outlet over the period;
   using the processor and the memory to determine whether the monitoring data pattern matches with a pattern in the metering data associated with the first power outlet, wherein the monitoring data pattern matches with the pattern in the metering data when at least one aspect of at least one combination of a peak and a valley in the monitoring data pattern matches with a comparable aspect of at least one combination of a peak and a valley in the pattern in the metering data, wherein the at least one aspect of the at least one combination of a peak and a valley comprises a number of peaks and valleys in the monitoring data pattern and the comparable aspect of the at least one combination of a peak and a valley in the pattern in the metering data comprises the number of peaks and valleys in the pattern in the metering data;
   using the processor and the memory to form, responsive to determining a match, a relationship between the equipment and the first power outlet, whereby the first power outlet is known to supply electrical power to the equipment; and
   using the processor and the memory to use the relationship information to adjust power supply from the first power outlet to the equipment, wherein when a set of distinctive characteristics in the monitoring data cannot be determined over the period, further comprising:
      using the processor and the memory to monitor an operation of the equipment to produce a benchmark data over a benchmark period in a test environment;
      using the processor and the memory to select the period such that the period is of the same length as the benchmark period; and
      using the processor and the memory to use the benchmark data as the monitoring data for determining the match with the metering data associated with the first power outlet.

2. The computer implemented method of claim 1, wherein determining whether the monitoring data pattern matches with a pattern further comprises:
   comparing a set of distinctive characteristics of the monitoring data with a set of distinctive characteristics of the metering data associated with the first power outlet; and
   determining that the match exists if a subset of the set of distinctive characteristics of the monitoring data is similar to a second subset of the set of distinctive characteristics of the metering data associated with the first power outlet.

3. The computer implemented method of claim 1, further comprising:
   selecting, responsive to the determining being negative, a second power outlet in the plurality of power outlets;
   searching a second metering data associated with the second power outlet;
   determining whether the monitoring data matches with the metering data associated with the second power outlet; and
   responsive to determining a match with the metering data associated with the second power outlet, forming a relationship between the equipment and the second power outlet, whereby the second power outlet is known to supply electrical power to the equipment.

4. The computer implemented method of claim 1, wherein the at least one aspect of the at least one combination of a peak and a valley comprises a set of peaks and valleys appearing in a particular order in the monitoring data pattern and the comparable aspect of the at least one combination of a peak and a valley in the pattern in the metering data comprises the set of peaks and valleys appearing in the particular order in the pattern in the metering data, wherein the equipment is a facilities equipment.

5. The computer implemented method of claim 1, wherein determining whether the monitoring data matches with the metering data is matching a pattern of power factor changes over the period in the monitoring data with a pattern of power factor changes in the metering data.

6. The computer implemented method of claim 1, wherein the at least one aspect of the at least one combination of a peak and a valley comprises a spacing between the peak and the valley of the at least one combination of the peak and the valley in the monitoring data pattern and the comparable aspect of the at least one combination of a peak and a valley in the pattern in the metering data comprises the spacing between the peak and the valley of the at least one combination of the peak and the valley in the pattern in the metering data, wherein the workload is configurable to produce a set of distinctive characteristics over the period in the monitoring data.

7. A computer usable program product comprising a non-transitory computer usable medium including computer usable code for discovering a relationship between an equipment and an electrical power outlet, the computer usable code when executed causes a computer to:
- monitor for a period, a workload executing on the equipment, the monitoring resulting in a monitoring data pattern;
- search a metering data associated with a first power outlet in a plurality of power outlets, the metering data representing electrical power drawn from a power outlet over the period;
- determine whether the monitoring data pattern matches with a pattern in the metering data associated with the first power outlet, wherein the monitoring data pattern matches with the pattern in the metering data when at least one aspect of at least one combination of a peak and a valley in the monitoring data pattern matches with a comparable aspect of at least one combination of a peak and a valley in the pattern in the metering data;
- responsive to determining a match, form a relationship between the equipment and the first power outlet, whereby the first power outlet is known to supply electrical power to the equipment, wherein when a set of distinctive characteristics in the monitoring data cannot be determined over the period, further comprising:
  - monitoring an operation of the equipment to produce a benchmark set of data over a benchmark period in a test environment;
  - selecting the period such that the period is of the same length as the benchmark period; and
  - use the benchmark data as the monitoring data for determining the match with the metering data associated with the first power outlet; and
  - use the relationship information to adjust power supply from the first power outlet to the equipment.

8. The computer usable program product of claim 7, wherein the determining further comprises:
- computer usable code for comparing a set of distinctive characteristics of the monitoring data with a set of distinctive characteristics of the metering data associated with the first power outlet; and
- computer usable code for determining that the match exists if a subset of the set of distinctive characteristics of the monitoring data is similar to a second subset of the set of distinctive characteristics of the metering data associated with the first power outlet.

9. The computer usable program product of claim 7, further comprising:
- computer usable code for selecting, responsive to the determining being negative, a second power outlet in the plurality of power outlets;
- computer usable code for searching a second metering data associated with the second power outlet;
- computer usable code for determining whether the monitoring data matches with the metering data associated with the second power outlet; and
- computer usable code for responsive to determining a match with the metering data associated with the second power outlet, forming a relationship between the equipment and the second power outlet, whereby the second power outlet is known to supply electrical power to the equipment.

10. The computer usable program product of claim 7, wherein the at least one aspect of the at least one combination of a peak and a valley comprises a set of peaks and valleys appearing in a particular order in the monitoring data pattern and the comparable aspect of the at least one combination of a peak and a valley in the pattern in the metering data comprises the set of peaks and valleys appearing in the particular order in the pattern in the metering data, wherein the equipment is a facilities equipment.

11. The computer usable program product of claim 7, wherein determining whether the monitoring data matches with the metering data is matching a pattern of power factor changes over the period in the monitoring data with a pattern of power factor changes in the metering data.

12. The computer usable program product of claim 7, wherein the at least one aspect of the at least one combination of a peak and a valley comprises a spacing between the peak and the valley of the at least one combination of the peak and the valley in the monitoring data pattern and the comparable aspect of the at least one combination of a peak and a valley in the pattern in the metering data comprises the spacing between the peak and the valley of the at least one combination of the peak and the valley in the pattern in the metering data, wherein the workload is configurable to produce a set of distinctive characteristics over the period in the monitoring data.

13. The computer usable program product of claim 7, wherein when a set of distinctive characteristics in the monitoring data cannot be determined over the period, further comprising:
- computer usable code for monitoring an operation of the equipment to produce a benchmark data over a benchmark period in a test environment;
- computer usable code for selecting the period such that the period is of the same length as the benchmark period; and
- computer usable code for using the benchmark data as the monitoring data for determining the match with the metering data associated with the first power outlet.

14. The computer usable program product of claim 7, wherein the computer usable code is stored in a computer readable storage medium in a data processing system, and wherein the computer usable code is transferred over a network from a remote data processing system.

15. The computer usable program product of claim 7, wherein the computer usable code is stored in a computer readable storage medium in a server data processing system, and wherein the computer usable code is downloaded over a network to a remote data processing system for use in a computer readable storage medium associated with the remote data processing system.

16. A data processing system for discovering a relationship between an equipment and an electrical power outlet, the data processing system comprising:
- a storage device, wherein the storage device stores computer usable program code; and
- a processor, wherein the processor executes the computer usable program code, and wherein the computer usable program code comprises:
  - computer usable code for monitoring for a period, a workload executing on the equipment, the monitoring resulting in a monitoring data pattern;
  - computer usable code for searching a metering data associated with a first power outlet in a plurality of power outlets, the metering data representing electrical power drawn from a power outlet over the period;
  - computer usable code for determining whether the monitoring data pattern matches with a pattern in the metering data associated with the first power outlet, wherein the monitoring data pattern matches with the pattern in the metering data when at least one aspect of at least one combination of a peak and a valley in the monitoring data pattern matches with a comparable aspect of at least one combination of a peak and a valley in the pattern in the metering data; and computer usable code for responsive to determining a match, forming a relationship between the equipment and the first power outlet, whereby the first power outlet is known to supply electrical power to the equipment, wherein when a set of distinctive characteristics in the monitoring data cannot be determined over the period, further comprising:

computer usable code for monitoring an operation of the equipment to produce a benchmark data over a benchmark period in a test environment;

computer usable code for selecting the period such that the period is of the same length as the benchmark period; and computer usable code for using the benchmark data as the monitoring data for determining the match with the metering data associated with the first power outlet.

17. The data processing system of claim 16, wherein the determining further comprises:

computer usable code for comparing a set of distinctive characteristics of the monitoring data with a set of distinctive characteristics of the metering data associated with the first power outlet; and computer usable code for determining that the match exists if a subset of the set of distinctive characteristics of the monitoring data is similar to a second subset of the set of distinctive characteristics of the metering data associated with the first power outlet.

* * * * *